United States Patent
Lovelock

[15] 3,677,275
[45] July 18, 1972

[54] METHOD AND APPARATUS FOR CONTROLLING THE FLOW OF GASES

[72] Inventor: James E. Lovelock, Bowerchalke, near Salisbury, England

[73] Assignee: Pye Limited, Cambridge, England

[22] Filed: Dec. 22, 1969

[21] Appl. No.: 887,028

[30] Foreign Application Priority Data

Dec. 31, 1968    Great Britain......................61,981/68
March 31, 1969   Great Britain......................16,647/69

[52] U.S. Cl..............................137/13, 137/81.5, 137/341, 137/608
[51] Int. Cl..........................................F15d 1/02, F15c 1/04
[58] Field of Search......................137/2, 13, 81.5, 251, 341, 137/608; 73/30, 55, 357, 362.8, 368

[56] References Cited

UNITED STATES PATENTS

| | | | |
|---|---|---|---|
| 3,568,693 | 3/1971 | Vandrey | 137/81.5 X |
| 3,302,451 | 2/1967 | Martin | 73/55 |
| 3,314,294 | 4/1967 | Colston | 137/81.5 X |
| 3,388,862 | 6/1968 | Gabrielson | 137/81.5 X |
| 3,534,765 | 10/1970 | King et al. | 137/341 |

*Primary Examiner*—William R. Cline
*Attorney*—Woodhams, Blanchard and Flynn

[57] ABSTRACT

The invention relates to a method and apparatus for controlling the flow rate of a gas. The flow rate of a gas through a tube which is long compared to its internal diameter is inversely proportional to the gas viscosity, which in turn, is directly related to the square root of the absolute temperature of the gas and is independent of the gas pressure. The gas is passed through a single tube, or a number of interconnected tubes, the tube or tubes being heated electrically whereby to change the gas viscosity and hence flow rate. Changes in gas flow may be detected by a transducer to initiate a signal controlling the heating current.

9 Claims, 5 Drawing Figures

PATENTED JUL 18 1972 3,677,275
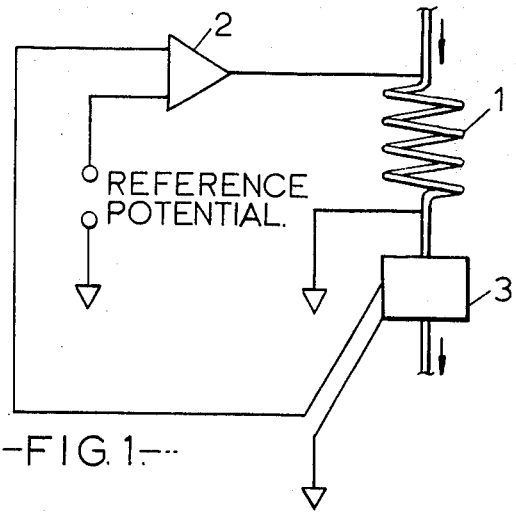
—FIG. 1.—
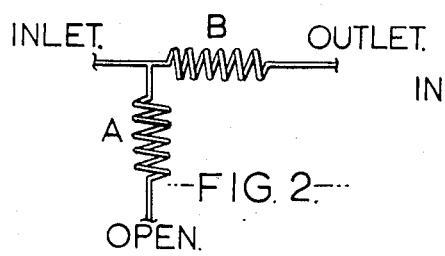
—FIG. 2.—
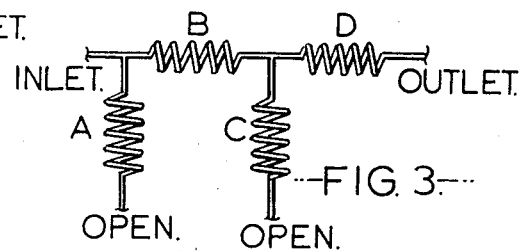
—FIG. 3.—
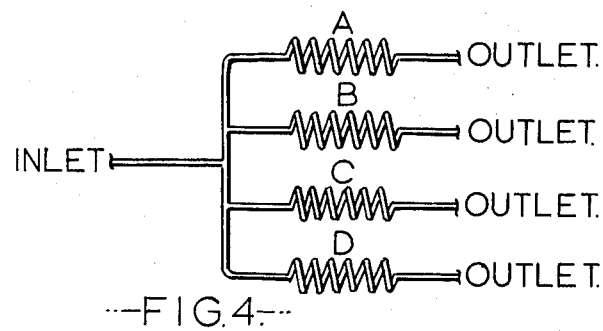
—FIG. 4.—
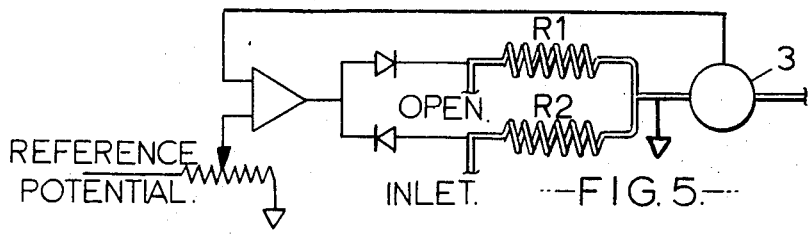
—FIG. 5.—
INVENTOR:
JAMES EPHRAIM LOVELOCK
BY
Woodhams, Blanchard & Flynn
ATTORNEYS

METHOD AND APPARATUS FOR CONTROLLING THE FLOW OF GASES

The present invention relates to a method and apparatus for controlling the flow rate of a gas.

According to one aspect of the present invention a method of controlling the flow rate of a gas comprises passing the gas through a control element in the form of a tube which is long compared to its internal diameter and changing the temperature of the control element whereby to change the viscosity and hence the flow rate of the gas.

According to another aspect of the present invention an apparatus for controlling the flow rate of a gas comprises a control element in the form of a tube which is long compared to its internal diameter and means for changing the temperature of the control element whereby to change the viscosity and hence the flow rate of a gas flowing therethrough.

Preferably, the control element comprises a plurality of interconnected tubes the temperatures of which are independently variable.

While the control of the flow rate may be achieved by a manual control of the temperature of the tube or by changing the temperature according to a pre-arranged program, preferably, the tube is heated electrically by the output current of an operational amplifier. The output current is controlled by a signal emitted by a gas flow transducer located in the gas flow emerging from the control element. Preferably the gas flow transducer is an ionization anemometer and a signal from the anemometer is compared to that corresponding to a desired flow rate and any difference in potential is fed to the summing point of the operational amplifier.

The invention will be described further, by way of example, with reference to the accompanying drawings; in which FIG. 1 is a schematic diagram of a first embodiment of an apparatus according to the invention;

FIG. 2 is a schematic representation of one pair of interconnected tubes forming a control element;

FIG. 3 is a schematic representation of two pairs of interconnected tubes giving an increased range of control;

FIG. 4 is a schematic representation of a plurality of tubes connected in parallel; and FIG. 5 is a schematic representation of one example of an electronic operational flow control system according to the invention.

The rate of flow of a gas through a tube which is long compared to its internal diameter is inversely proportional to the gas viscosity. In turn, the gas viscosity is directly related to the square root of the absolute temperature of the gas and is independent of the gas pressure.

The apparatus in FIG. 1 comprises a control element in the form of an elongate tube made from a material, the temperature of which can be changed rapidly. The tube can be heated electrically, for example, and preferably has the smallest mass consistent with strength to contain the gas at high temperatures and pressures to be encountered in practice. Thus the tube may be formed from platinum, nichrome and stainless steel, these being examples of metals having high resistivities and which may be heated to a high temperature in air without suffering damage. The tube may be of any desired cross-section and may be open internally or packed with particles. If the latter, space must be available between the particles to permit the flow of gas through the tube. The control element may also comprise an assembly of tubes joined in parallel.

With reference to the drawing the control element 1 is in the form of a coiled tube. The tube 1 is heated electrically by the output current from an operational amplifier 2. The direction of gas flow through the tube is indicated by the arrow. A gas flow transducer 3, such as a hot wire anemometer, an electro-mechanical transducer or an ionization anemometer is included in the outflow from the control element. (An ionization anemometer is described in Journal Scientific Instruments VOL 26, page 367, 1949).

The signal from transducer 3 is compared with that corresponding to a desired flow rate and any difference in potential fed to the summing point of the operational amplifier. The heating current in the control element will then change until a null is achieved.

This arrangement is suitable for an accurate control of low gas flow rates such as encountered in gas chromatography, gas analysis and flame spectrometry. In flame spectrometry, for example, it might be desirable to control the flow according to the instructions of a transducer observing some property other than gas flow rate, such as light emission from the flame. The present control element could be incorporated in such a system.

Example

A control element comprises a palladium silver alloy tube 10 inches long, 0.003 inch internal diameter and 0.0015 inch wall thickness. A current of 2 amperes at 5 volts was sufficient to heat the tube to 700° C. Between room temperature and 400° C there was a four fold change in gas flow rate through the tube, the gas being helium. An ionization anemometer was utilized as the gas flow transducer. Such an anemometer offers no obstruction to gas flow, is very sensitive and produces a signal large enough for direct comparison at the input of the amplifier.

In FIG. 2, gas enters the inlet and flows to the junction of tubes A and B. The end of tube A remote from the junction is open while the end of tube B remote from the inlet is connected to a gas flow transducer, such as an ionization anemometer.

From the junction of the two tubes A and B the gas can flow along both tubes. With tube A heated, preferably by electrical means, and tube B cold there will be an increase in viscosity of the gas in tube A and hence a reduction in the gas flow along tube A. The result is an increase in gas flow along the cold tube B to the transducer. Likewise a decrease in gas flow to the transducer takes place if tube A is cold and tube B is heated.

FIG. 3 shows the addition of two further tubes C and D to the simple system of FIG. 2 whereby to increase the control range of the apparatus. Additional pairs of tubes can be added to the arrangement shown in FIG. 3.

FIG. 4 shows four tubes A,B,C and D connected in parallel to a common inlet. Each tube is connected to a gas flow transducer at the outlet end thereof. In this arrangement the gas flow at the inlet may be divided into controlled variable proportions by heating the tubes.

FIGS. 2, 3 and 4 are but examples of a variety of different combinations of tubes.

FIG. 5 illustrates an electronic operational flow control employing two electrically heated tubes $R_1$ and $R_2$. It is analogous to the single tube system described and illustrated with reference to FIG. 1.

In FIG. 5, $R_1$ and $R_2$ represent electrically heated tubes. For the lowest rate of flow $R_2$ is hot, that is the maximum current is flowing through $R_2$ and the amplifier output is negative with respect to ground. $R_1$ will remain cold since the diode in series therewith will allow no current flow. As the reference potential is changed so the amplifier output diminishes towards zero and the temperature of $R_2$ falls and the flow increases. When the amplifier output becomes positive with respect to ground the current flows in $R_1$ which heats and this becomes less conductive to gas flow. Consequently more gas flows to the outlet through the flow sensor 3 and the net flow increases as the current in $R_1$ increases. Once set at any given flow the signal from the flow sensor can cause through the amplifier changes in the temperatures of $R_1$ and $R_2$ to oppose any Change in the flow rate through the sensor to the outlet.

I claim:

1. A method of controlling the flow rate of a gas comprising passing the gas through a control element in the form of a plurality of metal tubes which are interconnected in parallel and which are long compared to their internal diameter to create a viscous flow of gas therethrough and changing the temperature of the control element tubes, the temperatures of which are independently variable, by passing an electric current through the length of the walls thereof whereby to change the viscosity and the flow rate of the gas and allow control of relative flow rates through said tubes.

2. An apparatus for controlling the flow rate of a gas comprising a control element in the form of a metal tube which is long compared to its internal diameter to create a viscous flow of gas therethrough and electrical heating means for passing an electric current through the length of the wall of said tube for changing the temperature of the control element so as to change the viscosity and the flow rate of the gas, in which the control element comprises a pair of tubes interconnected in parallel, that is with one end of each connected to a common source, so that for any given total rate of flow from the source the rate of flow through one tube affects the rate of flow through the other, the temperatures of the tubes being independently variable, the temperature of one of the tubes being variable whereby to control gas flow therethrough and hence regulate flow through the second tube of the pair.

3. An apparatus according to claim 2 including a second pair of tubes connected in parallel with the outlet of said second tube connected to said second pair of tubes.

4. An apparatus for controlling the flow rate of a gas comprising a control element in the form of a metal tube which is long compared to its internal diameter to create a viscous flow of gas therethrough and electrical heating means for passing an electric current through the length of the wall of said tube for changing the temperature of the control element so as to change the viscosity and the flow rate of the gas in which the control element comprises a plurality of tubes interconnected in parallel, the temperatures of which are independently variable to allow control of relative flow through said tubes.

5. An apparatus according to claim 4 in which said electrical heating means comprises an operational amplifier, a gas flow transducer being connected to the gas outlet of the control element, the output current of said amplifier being controlled by said transducer.

6. An apparatus for controlling the flow rate of a gas comprising a control element in the form of a metal tube which is long compared to its internal diameter to create a viscous flow of gas therethrough and electrical heating means for passing an electric current through the length of the wall of said tube for changing the temperature of the control element so as to change the viscosity and the flow rate of the gas, and a transducer connected to the control element, said heating means being controlled by said transducer.

7. An apparatus according to claim 6 in which said electrical heating means comprises an operational amplifier, said transducer is a gas flow transducer connected at the gas outlet of the control element, the output current of said amplifier being controlled by said transducer.

8. An apparatus according to claim 7 including a further tube connected at one end between said first-mentioned tube and said transducer in a manner that gas flow through said transducer increases with increased flow in said first-mentioned tube and reduced flow in said further tube, means for connecting the output of said operational amplifier to said tubes and including oppositely directed unidirectional current control means for oppositely varying the heating of said tubes in response to a variation of flow through said transducer from a desired rate.

9. An apparatus according to claim 7 including means connecting the output of said transducer and of a reference signal source to inputs of said operational amplifier, for varying the gas flow rate in said tube in response to variations in said reference signal.

* * * * *